(12) United States Patent
Guskov et al.

(10) Patent No.: US 7,793,612 B2
(45) Date of Patent: Sep. 14, 2010

(54) RING PLASMA JET METHOD AND APPARATUS FOR MAKING AN OPTICAL FIBER PREFORM

(75) Inventors: Mikhail I. Guskov, St. Petersburg (RU); Mohd A. Aslami, Sturbridge, MA (US); Evgueni B. Danilov, St. Petersburg (RU); Dau Wu, Fallbrook, CA (US)

(73) Assignee: Silica Tech, LLC, White Plains, NY (US)

( * ) Notice: Subject to any disclaimer, the term of this patent is extended or adjusted under 35 U.S.C. 154(b) by 515 days.

(21) Appl. No.: 11/644,870

(22) Filed: Dec. 26, 2006

(65) Prior Publication Data

US 2007/0169698 A1 Jul. 26, 2007

Related U.S. Application Data

(63) Continuation-in-part of application No. 10/631,720, filed on Aug. 1, 2003, now abandoned.

(51) Int. Cl.
| | |
|---|---|
| C23C 16/00 | (2006.01) |
| C23F 1/00 | (2006.01) |
| H01L 21/306 | (2006.01) |
| B23K 9/00 | (2006.01) |
| B23K 9/02 | (2006.01) |
| C03C 25/00 | (2006.01) |
| C03B 37/01 | (2006.01) |

(52) U.S. Cl. .............. 118/723 R; 118/723 E; 118/715; 156/345.33; 219/121.48; 219/121.5; 219/121.51; 65/391; 65/436

(58) Field of Classification Search .............. 118/723 E, 118/723 R, 715; 65/391, 436; 156/345.33; 219/121.48, 121.5, 121.51
See application file for complete search history.

(56) References Cited

U.S. PATENT DOCUMENTS

| | | | |
|---|---|---|---|
| 4,259,101 A | | 3/1981 | Tsukuda et al. |
| 4,262,035 A | * | 4/1981 | Jaeger et al. ................. 427/571 |
| 4,402,720 A | * | 9/1983 | Edahiro et al. ................ 65/391 |
| 4,417,911 A | * | 11/1983 | Cundy et al. .................. 65/391 |
| 4,440,558 A | | 4/1984 | Nath et al. |
| 4,597,787 A | * | 7/1986 | Jacobson ...................... 65/430 |
| 4,735,648 A | * | 4/1988 | Marshall ....................... 65/419 |
| 6,007,786 A | * | 12/1999 | Campion et al. ............. 422/189 |
| 6,105,396 A | * | 8/2000 | Glodis et al. .................. 65/377 |
| 6,125,225 A | * | 9/2000 | Dianov et al. ................ 385/124 |

(Continued)

Primary Examiner—Parviz Hassanzadeh
Assistant Examiner—Rakesh Dhingra
(74) Attorney, Agent, or Firm—Patton Boggs LLP

(57) ABSTRACT

A method and apparatus for making an optical fiber preform, including injecting a plasma gas source into the first end of a tubular member; generating a ring plasma flame with the plasma gas source flowing through a plasma gas feeder nozzle, the plasma gas feeder nozzle including: an inner tube, an outer tube, wherein the plasma gas source is injected between the inner tube and the outer tube to produce the ring plasma flame, such that at least a portion of the ring plasma flame is directed radially toward the inner surface of the tubular member; traversing the tubular member along the longitudinal axis relative to the plasma flame; depositing at least one soot layer on the interior surface of the tubular member by introducing reagent chemicals into the plasma flame; and fusing all of the soot layers into a glass material on the interior surface of the tubular member.

18 Claims, 8 Drawing Sheets

U.S. PATENT DOCUMENTS

| | | |
|---|---|---|
| 6,362,449 B1 * | 3/2002 | Hadidi et al. .......... 219/121.36 |
| 6,769,275 B2 * | 8/2004 | Guskov et al. ................ 65/414 |
| 2002/0162359 A1 * | 11/2002 | Tennent et al. ................ 65/391 |
| 2003/0052095 A1 * | 3/2003 | Sanders et al. ......... 219/121.39 |
| 2003/0056548 A1 * | 3/2003 | Sandro et al. ................. 65/419 |
| 2003/0084685 A1 | 5/2003 | Tumminelli |
| 2005/0022561 A1 | 2/2005 | Guskov et al. |
| 2006/0179893 A1 | 8/2006 | Jolly et al. |

* cited by examiner

RING PLASMA JET METHOD AND APPARATUS FOR MAKING AN OPTICAL FIBER PREFORM

CROSS-REFERENCES TO RELATED APPLICATIONS

This application is a continuation-in-part of U.S. application Ser. No. 10/631,720 filed 01 Aug. 2003 now abandoned.

FIELD OF THE INVENTION

The invention relates to the manufacture of optical fiber and, more particularly, to the deposition and sintering of materials using a plasma torch.

Problem

Optical fiber has been manufactured in commercial quantities since at least the early 1970s. One example of the known manufacturing methods is to first make a cylindrical preform, generally of a silica material, and then heat the preform to a viscous state and draw it into a fiber. The silica material making up the preform is typically mixed with selected chemicals to impart a desired cross sectional profile of optical qualities, particularly with respect to the index of refraction.

One example process for making preforms is Outside Vapor Deposition (OV) is described by U.S. Pat. No. 3,737,292 to Keck, and U.S. Pat. No. 3,932,162 to Blankenship. Other examples of known processes for making preforms by Vapor Axial Deposition (VAD) are described by U.S. Pat. Nos. 4,062,665 and 4,224,046, both to Izawa, et al.

A further example of the processes known for making preforms is Plasma Chemical Vapor Deposition (PCVD) such as described, for example, by U.S. Pat. Nos. 4,741,747 and 4,857,091 both to Geiftner, et al. PCVD starts with a thin-walled starter tube, which is rotated in a lathe with chemicals flowing through the tube interior. A microwave source generates a non-isothermal plasma, which induces heterogeneous chemical reactions to form a very thin glassy layer on the inner surface of the tube. The layers are repeated until a desired thickness of build-up is obtained, whereupon the tube is collapsed into a preform. This heterogeneous reaction limits the rate at which glass is deposited, i.e., the deposition rate. The PCVD method also has a limitation in the preform size.

The Modified Chemical Vapor Deposition (MCVD) process, such as described by U.S. Pat. No. 3,982,916 to Miller, U.S. Pat. No. 4,217,027 to MacChesney et al., U.S. Pat. No. 5,000,771 to Fleming et al., and U.S. Pat. Nos. 5,397,372 and 5,692,087 both to Partus et al., is an additional known process for making preforms.

A typical MCVD process begins with mounting a silica or quartz tube to the rotatable chucks of a lathe. The longitudinal axis of the tube is vertical or horizontal, depending on the construction of the lathe. Arranged with the lathe is a chemical delivery system which injects a variable mixture of chemicals into one end of the tube as it rotates. To deposit material, an oxygen-hydrogen chemical flame torch, or a plasma torch, is traversed along the length of the rotating tube while the chemicals are being injected. The torch's traversal is typically in the downstream direction of the chemicals flowing through the tube interior. The torch flame creates a heat condition in a section of the tube interior. The heat condition promotes chemical reactions within the mixture flowing through that section. The chemical reactions produce particulate reaction products such as, for example, silicon dioxide $SiO_2$ and germanium dioxide $GeO_2$. These reaction products are carried downstream within the tube interior by the chemical mixture flow, and deposited on the interior surface, downstream of the heated section. The torch moves in the downstream direction of the chemical mixture flow, and when it reaches sections of the tube having deposited reaction products, its heat has two effects. One is to heat the interior to cause the above-described reactions in the chemicals flowing in that section, which are carried further downstream as described above. The other effect is that it heats and fuses the reaction products deposited from the reactions when the torch was located upstream, the fusing converting the reaction products into silica glass.

When the torch has traversed the entire length of the tube, a layer of the silica glass has been formed on the tube's inner surface. The torch is then moved back to its starting position and again traversed along the length while the chemicals are injected into the tube interior. This forms another layer of silica glass, over the layer of silica glass deposited by the previous traversal. The process is repeated until a desired thickness of silica layers is formed on the inside of the tube. The tube is then heated and collapsed into a solid rod, which is the preform. The preform is then heated and drawn into optical fiber.

In MCVD, the basic chemical process is using a heat source to induce the homogeneous chemical reactions to form soot particles, the soot particles being deposited down stream of the chemical flow and fused into glass layer as the heat source moved over the deposited region. The process condition requires a laminar flow within the tube. The main driving force to deposit the soot particles is thermophoretic force, which depends on the temperature difference of the reaction zone and tube wall. See, for example, Walker et al., *Journal of Colloid and Interface Science* Vol. 69-1, P. 138, (1979), Walker et al., *Journal of the American Ceramic Society* Vol. 63-9/10, P. 552(1980), Simpkins et al., *Journal of Applied Physics* Vol. 50-9, P. 5676, (1979).

A variation of the above-described MCVD, known in the art of optical fiber manufacturing as "plasma fire ball," surrounds a tube with a coil energized by a radio frequency (RF) source to establish a plasma region, or "plasma fire ball," in a center region of the tube. Examples of the "plasma fire ball" process are described by U.S. Pat. No. 4,262,035 to Jaeger et al., U.S. Pat. No. 4,331,462 to Fleming et al., and U.S. Pat. No. 4,402,720 to Edahiro et al. Another "fire-ball" method is disclosed by U.S. Pat. No. 4,349,373 to Sterling et al., showing a method which first evacuates a tube and then operates under a partial vacuum (0.1 to 50 Torrs). In each of these methods, the fireball has the form of ellipsoid, located in the center of the tube between the coils, and the temperature in the center of the fireball is much higher than the edge of the fireball. Chemicals are introduced into the tube such that reactions occur in and proximal to the fire ball, and reactant products or soot tend to move toward the inner surface of the tube, due to a thermophoretic force comparable to that for MCVD.

The MCVD process, although widely used, requires significant time and costly equipment. The time is significant because of the rate, in terms of grams-per-minutes minute, that MCVD can deposit glass on the inner surface of the tube. The MCVD equipment cost is high, in part, because it requires a precision lathe mechanism, and a well-controlled torch and chemical delivery system. Also, the processing environment must be closely controlled. An example is that air-borne water vapor must be kept to a minimum, as it causes unwanted chemical reactions, which in turn generates byproducts that contaminate the silica glass. The processing time, which is based on the deposition rate limitations of existing MCVD methods, coupled with the expense of the processing equipment, equals a high cost for making each preform. The cost is further increased because many of the tests of the preform's optical qualities cannot be performed until the processing is complete. Therefore, if the preform fails the tests such that it must be discarded, the entire processing time is lost.

Strategies and methods for reducing processing cost have been identified in the art. One is to make a larger diameter preform. The immediate benefit is that the larger the preform, the longer the period of time between set-ups. Stated differently, a larger preform reduces the set-up overhead in preform fabrication, which is the percentage of time that the equipment is being set-up as opposed to depositing material to make a preform. More particularly, set-up includes installing the starting tube into the lathe, positioning the torch and ensuring proper operation of the chemical delivery system. The time required for set-up is substantially constant regardless of the preform diameter, i.e., an increase in preform diameter does not substantially increase the time required for set-up. Therefore, even though increasing the diameter of the preform increases time required for deposition, the equipment utilization is increased because the percentage of time that the equipment is occupied for set-up instead of glass deposition decreases. One of the secondary benefits is that fewer operators may be needed because, particularly by staggering set-ups, one person may be able to monitor, or operate more than one workstation.

However, if larger preforms are made but the deposition rate is not increased, and if the percentage of preforms rejected for quality reasons remains constant, a substantial portion of the efficiency improvement is lost. It is lost because, as identified above, some of the preform quality tests cannot be carried out until the deposition or, in some instances, the collapsing is complete. Notwithstanding the lower set-up overhead, larger preforms take longer to make. If the deposition rate for the larger preform is the same as the deposition rate for the smaller preform then the deposition time is proportionally higher. Therefore the processing effort and time lost when a larger preform fails quality tests are higher than those lost when a smaller preform fails. For this reason, a larger preform may obtain a net increase in processing rate, because of the above-described reduction in set-up overhead, but substantial processing time is still lost when a large preform fails to meet quality standards.

Accordingly, as costs become more and more competitive, the need for increased deposition rate remains a continuing objective. A higher deposition rate would shorten the process time and reduce the labor cost. The higher rate would tend to make larger preforms more economical, especially if the reject rate could be improved. Further, a higher deposition rate would save on capital investments, because it would require less preform fabrication equipment for the same total fiber production output.

MCVD process has been widely used in preform fabrication, because it is relative simple process comparing with other processes. However, the deposition efficiency, raw material conversion or material utilization was very poor. Typically, it was about 50% for $SiCl_4$ and less than 25% for $GeCl_4$. A higher efficiency with better than 90% for $SiCl_4$ and 80% for $GeCl_4$ would mean significant cost saving in raw material.

Publications describe using a plasma jet to deposit silica in an axial direction. U.S. Pat. No. 4,242,118, issued to Irven, shows one such method, describing making optical preforms using a radio frequency (RF) plasma jet under low pressure (1 to 50 torrs) to deposit glass in the axial direction. The Irven patent's disclosed method cannot, however, make low OH content preforms without at least one modification not shown by Irven, namely performing its disclosed deposition with a sealed chamber. U.S. Pat. No. 4,062,665, issued to Isizawa et al., and U.S. Pat. No. 4,135,901, issued to Fujiwara et al., have also reported depositing silica in an axial direction by plasma. All these reported methods have one common feature—the target is always facing (in front of) the plasma jet flow direction.

In addition, when trying to incorporate additional chemicals into the vitreous glass. Because vitreous glass is substantially non-porous, attempts to incorporate additional beneficial chemicals, such as fluorine, into it has been problematic. Fluorine gas does not diffuse through the substantially non-porous vitreous glass that has been previously deposited on a preform. Thus, the fluorine concentration found in prior art preforms was not particularly uniform throughout the preform. This is in part due to the chemical etching reaction on the previously deposited vitreous glass layer from the fluorine. Additionally, fluorine is a dopant used for lowering the index of refraction of the glass perform; it is also a very good etcher for the vitreous glass. In part, this causes a challenge when incorporating amounts of fluorine into the vitreous glass while concurrently keeping a high deposition rate during typical MCVD or PCVD processes.

Moreover, most of the rare earth containing chemicals are in a liquid phase or solid phase, and it is very difficult to incorporate these dopants into optical fiber preforms by the use of standard chemical vapor deposition processes. There is no report of the use of solid dopants to make active preforms. The following is the most commonly known method for using the liquid dopants to make active preforms. First, unconsolidated doped or undoped silica soot particles are deposited on the inside wall of a tube by flowing the dopant solution that contains the desired rare earth elements through the inside of the tube. Then the soot particles soak in the solution for some period of time, the solution is evaporated with lower heat and then the soot particles are consolidated and collapsed into the preform. It is obvious the prior art methods involve many processing steps and that they will be difficult to control the dopant concentration.

Furthermore, it is observed in a typical MCVD prior art deposition process that tapers exists at the intake and exhaust end of the deposition tubes, which can be as long as 20 cm. These are losses of deposition material that is inherent with such processes and that cause poor performance when creating fiber optic from the preform. Typically, additional controls are employed to reduce the tapering problem associated with MCVD processes.

SUMMARY

The present invention advances the art and overcomes the above-identified shortcomings, in addition to providing further benefits and features described herein.

An example apparatus includes a tube support, for holding a tubular work piece having an outer cylindrical surface concentric with an interior volume defined by an inner cylindrical surface surrounding a longitudinal axis. The example apparatus further includes an induction coil, having windings about a clearance hole concentric with a coil axis, and a radial plasma gas flow nozzle shaped and dimensioned to be insertable into the interior volume of the tube and movable along a length of the interior volume. The example apparatus further includes a nozzle translation apparatus for supporting the radial plasma gas flow nozzle within the tube interior volume and moving the tube relative to the radial plasma gas flow nozzle, along the longitudinal axis, and a coil translation apparatus for supporting the induction coil such that the tube extends through the coil clearance hole and the induction coil is maintained in substantial alignment with the radial plasma gas flow nozzle while the nozzle translation device moves the radial plasma gas flow nozzle within the tube interior in the direction of longitudinal axis.

The example apparatus further includes an induction coil energy source, and a plasma gas source for supplying a plasma gas to the radial plasma gas flow nozzle, and a deposition chemical source for injecting selected chemicals into the tube interior volume, concurrent with the nozzle translation device moving the radial plasma gas flow nozzle within the tube interior in the direction of longitudinal axis.

In a further example apparatus, the tube support includes a first and a second rotatable chuck, constructed and arranged to secure and rotate the tubular work piece about the longitudinal axis, concurrent with the nozzle translation moving the radial plasma gas flow nozzle within the tube interior in the direction of longitudinal axis, and concurrent with the coil translation apparatus for supporting and moving the induction coil such that the tube extends through the coil clearance hole and the induction coil is maintained in substantial alignment with the radial plasma gas flow nozzle.

In the further example apparatus the second support and the induction coil are constructed and arranged such that, concurrent with the tubular work piece being rotated by the first and second rotatable chucks, the tubular work piece extends through the coil clearance hole, and the induction coil is movable in the direction of the common axis. An example apparatus further includes a controllable radio frequency power source connected to the induction coil.

An example apparatus further includes a plasma gas feeder translation drive coupled to the support bar, and an induction coil translation drive coupled to the induction coil support member, such that the gas feeder support bar and the induction coil support bar are each selectively movable in the direction of the common axis.

An example method includes rotating a tubular work piece about its longitudinal axis, a portion of the work piece extending through an induction coil arranged with its winding axis substantially collinear with the longitudinal axis of the silica tube work piece. The induction coil is energized by a radio frequency source, a radial plasma gas flow nozzle is inserted into the tube interior, and a plasma source gas is ejected from the nozzle. The coil is energized, and the plasma source gas is ejected such that a plasma flame is established proximal to the radial plasma gas flow nozzle, the plasma flame having a component in a radial direction, outward from the longitudinal axis of the tube, toward an interior surface of the tube. Chemicals are introduced into the tube interior concurrent with establishment of the plasma flame. The chemicals are introduced in a manner to undergo chemical reactions within and proximal to the plasma flame, and to generate soot, such that the soot is transferred to and deposited on the tube interior surface by the radial component of the plasma gas.

During the deposition process, a bright ring forms on the deposition tube, where the deposition and consolidation of the glass is taking place. The radial direction of the plasma jet is the driving force that forms this ring. This is also the driving force to deposit the soot particles; it is not the same "thermophoretic" force responsible for MCVD and PCVD processes. The thermophoretic force was taught by Walker et al., in the Journal of Colloid and Interface Science, Vol. 69, No. 1, Page 138, Mar. 15, 1979. Accordingly, the plasma jet is termed herein, for consistency of reference, as the "Ring Plasma Jet".

The radial plasma gas flow nozzle and the induction coil are moved relative to the tube, parallel to the longitudinal axis of the tube, such that the established plasma flame and soot deposition move along a length of the tube in the direction of the longitudinal axis.

In addition, the present invention further provides for the deposition of several soot layers where the last soot layer is concurrently deposited while all of the previously deposited soot layers are fused to vitreous glass. One benefit of this process is that when additional beneficial chemicals, such as fluorine, are deposited they easily diffuse through the several previously deposited soot layers due to their increased porosity relative to a fused vitreous glass layer. This provides for uniform concentration of the additional chemicals, such as fluorine, and greatly improves the deposition rate of the vitreous glass material of the preform.

This new process is most suitable for making active fiber such as fiber amplifier or fiber laser and it is a one-step process that can reduce the manufacturing cost. To make active fiber, requires doping with elements from the rare earth group for example: Erbium ($Er^{3+}$) or Neodymium ($Nd^{3+}$) and in the present invention these dopants can be introduced in either a liquid or solid form.

In addition to the improved optical fiber production from the optical fiber preform, it was observed that the deposition taper at the ends of the deposition tube were significantly reduced over prior methods.

The present invention further provides significantly reduced tapering of the intake and exhaust ends of the deposition tubes without employing additional controls as described above. This helps achieve very uniform deposition throughout the length of the deposition tubes that further contributes to better and longer fiber optic products from a single preform.

Further, the present invention further provides for injecting the reagent chemicals having a particular rotational flow pattern that is similar to the plasma gas and also in the same rotational direction as the plasma gas. By doing so, the deposition efficiency is greatly increased. It is also important to note that when the reagent chemicals and plasma gas are injected from the same side, they will have the same rotational direction. Conversely, when the reagent chemicals and plasma gas are injected from the opposite sides, they will have opposite rotational directions. For example, if the plasma gas has a clockwise rotation, then the reagent chemical stream will have a counterclockwise rotation. This will minimize deposition efficiency and create an uncontrollable turbulent flow inside the tube.

DETAILED DESCRIPTION OF THE DRAWINGS

Figure 1:
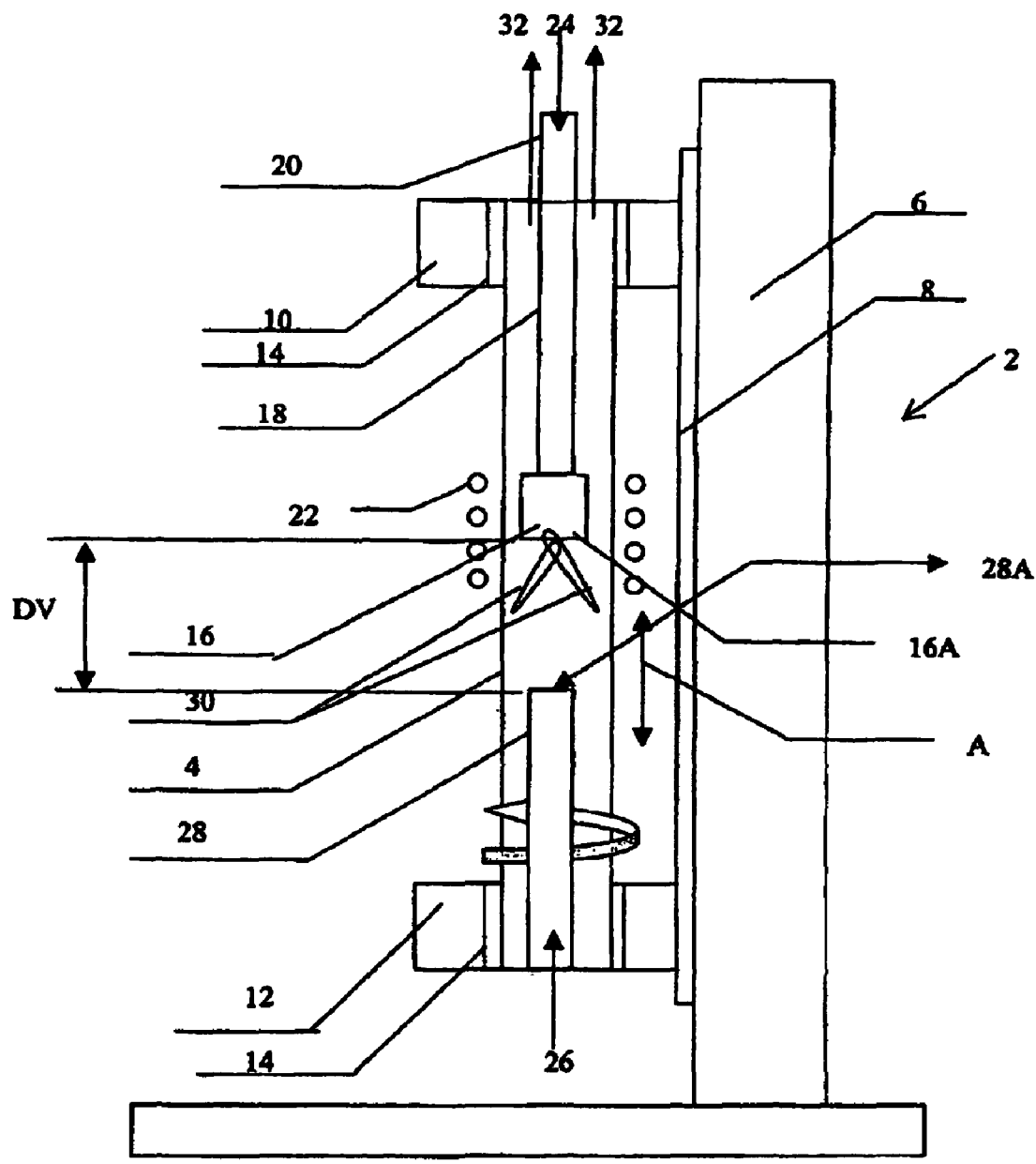
FIG. 1 illustrates a cross-section view of a deposition apparatus, for holding a tubular member vertical while depositing material using a Ring Plasma Jet flame according to an embodiment of the present invention.

Referring to FIGS. 1-8, like reference numerals are used to indicate like parts throughout the drawings. The described methods and embodiments employ a novel construction and arrangement of an isothermal plasma torch to deposit fused material such as silica, on the inner surface of a tubular work piece or starting tube. The isothermal torch is constructed and arranged such that a plasma flame is generated from a position within the interior volume of the tube, the generation being such that at least a component of the plasma flame is directed radially, i.e., normal to the longitudinal axis of the tube, toward the tube's interior wall. Selected chemicals are introduced into at least one end of the tube, such that selected chemical reactions form desired soot particles within and proximal to the generated plasma flame. The radial component of the plasma flame deposits the soot particles on the interior surface of the tube.

Alternative apparatuses and mechanisms for traversing the plasma flame, i.e., moving the plasma flame through the interior of the tube, in the direction of its longitudinal axis, are described. The rate of traversal, together with the energy level supplied to the induction coil, are selectable such that the soot is deposited and concurrently fused into, for example, vitreous glass or such that the soot is deposited without fusion. In one embodiment, the latter selection provides for depositing a layer of soot in a first pass, and then traversing the torch for a second pass that both deposits and fuses another layer, and fuses the soot deposited by the previous pass. In another embodiment, the latter selection provides for depositing several layers of soot via several traverses of the torch, and then traversing the torch for a latter pass that both deposits a soot layer and then fuses all previous soot layers into a vitreous glass layer. The described alternative apparatuses and mechanisms for supporting the tubular work piece include rotating the work piece while depositing and/or fusing the soot, and for holding the work piece vertical or horizontal during the deposition. Further, another alternative deposition apparatus the tubular work piece itself is moved relative to the plasma flame. The described formation of the plasma flame provides, among other benefits, substantially increased deposition rates over those achievable with conventional MCVD or with the prior art plasma "fire ball" methods.

Examples are described, referencing the attached figures and diagrams, that provide persons skilled in the art pertaining to the design and manufacturing of optical fiber with the information required to practice the claimed apparatuses and methods. The use of specific examples is solely to assist in understanding the described and claimed apparatuses and methods. Persons skilled in the art; however, will readily identify further variations, examples, and alternate hardware implementations and arrangements that are within the scope of the appended claims.

FIG. 1 shows a cross-sectional view of a first example plasma deposition apparatus 2, with a work piece, or deposition tube 4, installed. The deposition apparatus 2 includes a lathe or chuck support 6 supporting a movable platform 8, the platform 8 being movable in the vertical direction A by a platform translation drive (not shown). Mounted to the movable platform 8 is a first rotatable chuck, or headstock 10, and a second rotatable chuck or tailstock 12. A pair of spindles 14 for securing the work piece 4 and rotating it about the work piece's longitudinal axis is included with the headstock 10 and tailstock 12. One or both of the chucks 10 and 12 can be moved in the vertical A direction independently of the other, to permit-installation and removal of the work piece 4.

With continuing reference to FIG. 1, a plasma gas feeder nozzle 16 is supported inside of the deposition tube 4 by a combination support and plasma gas delivery tube 18. The plasma gas feeder nozzle should be substantially centered in the tube 4, an example tolerance being approximately 1 mm. The materials and construction of the combination support and plasma gas delivery tube 18 must account for the weight of the plasma gas feeder nozzle 16 and the operational temperature conditions. Upon reading the present description, the selection of such construction and materials is a design choice readily made by persons skilled in the art of optical fiber manufacturing. Example materials are quartz and stainless steel. Other example materials include titanium and high-temperature alloys such as, for example, INCONEL of Ni, Cr, Fe and other metals, and equivalents. The combination support and plasma gas delivery tube 18 extends out from an end of the work piece 4, having a rotational gas coupler 20 attached. An example construction of the plasma gas feeder nozzle 16 is described in further detail below in reference to FIG. 2.

Referring to the FIG. 1 example, an induction coil 22 is supported to surround the outside of the deposition tube 4. A conventional-type RF plasma energy source of, for example, 80 kW, is connected to the induction coil. It will be understood that the power of the generator will vary in the range from 20 kW to 80 kW, depending on the diameter of the deposition tube 4. For example, for a tube with 64 mm outer diameter, a typical power range is between 30 to 40 kW. The induction coil 22 and the plasma gas feeder nozzle 16 are supported to remain stationary in the FIG. 1 depicted alignment, which is that the nozzle's gas outlet (not show in FIG. 1) is surrounded by the coil 22, as the platform translation drive moves the platform 8 in the vertical direction A, thereby moving the tube 4 in the vertical direction.

A dry plasma gas 24, examples. including Ar, $O_2$, $N_2$, He, Kr, or mixtures thereof, preferably with a total moisture content less than 10 ppb OH, is delivered from the top end of the work piece tube 4 by the rotational coupler 20, through the combination support and delivery tube 18, into the plasma gas feeder nozzle 16. In the FIG. 1 example, reagent chemicals and carrier gas 26 are fed through a tube 28 made, for example, of quartz, from the bottom side of the deposition tube 4. To prevent the moisture diffusion from the bottom side of the deposition tube 4, another rotational coupler (not shown) is preferably used with the tube 28. Example reagent chemicals 26 are the base glass forming material such as, for example, $SiCl_4$, and the dopants for modifying the index of refraction of silica such as, for example, $GeCl_4$, $POCl_3$, $AlCl_3$, $TiCl_4$, $SiF_4$, $CF_4$, $SF_6$, and $BCl_3$. The carrier gas can be $O_2$ or the mixture of $O_2$ and He. To ensure the complete oxidation reaction, it is necessary to provide sufficient amounts of oxygen to the reaction zone.

The tube 28 is preferably held stationary with respect to the combination support and delivery tube 18, so that the distance DV between the lower end 16A of the plasma gas feeder nozzle 16 and the upper end 28A of the tube 28 is fixed. An example distance between the lower edge 16A of the plasma gas feeder nozzle 16 and the upper stationary edge of the quartz glass tube 28A is about 200 mm.

Since the FIG. 1 example feeds the carrier gas and reagent chemicals 26 flowing against the plasma gas 24, newly deposited glass layer material will be formed on the upper side of the plasma gas feeder nozzle 16. It should be understood that the FIG. 1 apparatus can deposit glass both when the tube 4 is moving up and when the tube is moving down, relative to the vertical direction A.

It is possible to feed the reagent chemicals 26 without the tube 28, but use of the tube is typically preferable, as it would generally enable more stable and better-controlled conditions for the chemical reaction.

Referring to FIG. 1, the plasma gas feeder nozzle 16 is preferably constructed and arranged to generate an at least partially radial flame, which as identified above is termed herein as the "Ring Plasma Jet" flame 30, which is a plasma flame having at least a portion or component directed toward the inner surface of the tube 4. As described above, the term "Ring Plasma Jet" is used because, typically, during a deposition process as described herein, a bright ring forms on the deposition tube 4 where the deposition and consolidation of the glass takes place. The radial direction of the ring plasma jet 30 is the driving force to form this ring.

Figure 2:
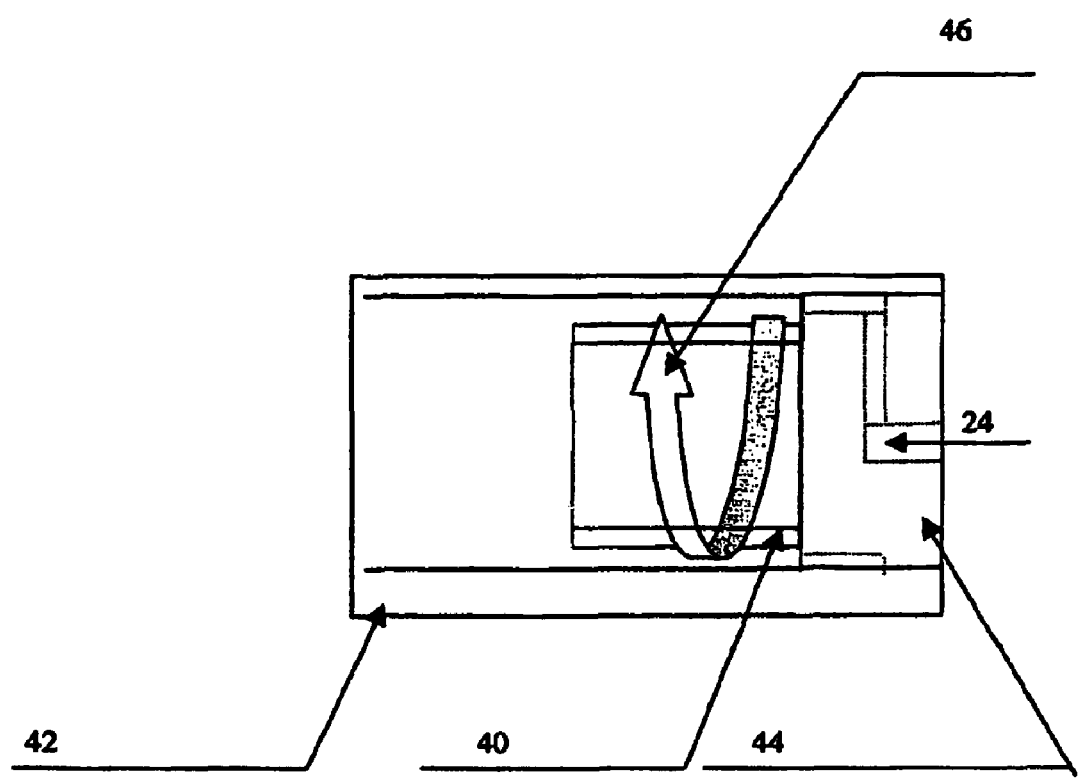
FIG. 2 illustrates a cross-section view of a detailed structure for a plasma gas feeder nozzle for establishing the Ring Plasma Jet flame according to an embodiment of the present invention.

FIG. 2 shows an example detailed structure by which the feeder nozzle 16, in the energy field of the induction coil 22, forms a plasma torch generating the desired Ring Plasma Jet flame 30.

Referring to FIG. 2, an example plasma gas feeder nozzle 16 has an inner tube 40, an outer tube 42, and a flow direction control structure 44. Example materials for each are, but are not limited to, quartz. Example dimensions for the inner tube 40 are: OD=30 mm, ID=26 mm, L=30 mm. Example dimensions for the outer tube 42 are: OD=40 mm, ID=36 mm, L=80 mm. The flow direction control structure 44 injects the plasma gas 24 between the inner and outer quartz glass tubes 40 and 42 to form a swirl motion 46. The dotted lines showed the flow path for the plasma gas 24 inside the flow control unit 44. The typical opening diameter for the plasma gas to exit the flow control unit is about 2 mm and the opening is aimed towards the inner tube 40. This swirl motion flow pattern 46 is one example for establishing a Ring Plasma Jet flame 30, as shown in FIG. 1. An example range for the flow rate of the plasma gas is from approximately 15 liters/minute (l/min) to 30 l/min. The specific flow rate is determined in part by the desired plasma power and how the reagent chemicals are introduced to the reaction zone. In practice, after the power for plasma is fixed, and the desirable deposition efficiency and/or rate is identified, the optimum flow rate can be readily found by performing test runs.

With continuing reference to FIG. 2, it is seen that when the swirl stream 46 of the plasma gas 24 flows out of the plasma gas feeder nozzle 16, it has a radial velocity in the direction toward the inner surface of the deposition tube 4 and a circular or swirl velocity about the longitudinal axis of the tube 4. Therefore, when the reagent chemicals 26 are introduced into the hot reaction zone, the Ring Plasma Jet 30 is a driving force to deposit and consolidate the glass soot particles.

Referring to FIG. 1, an exhaust 32 removes the by-product gases and also these un-deposited soot particles from the upper end of the deposition tube 4. Typically, the pressure inside the tube will be maintained at one atmosphere (Atm). The deposition process, however, can be operated in the range from 0.1 to 1.0 Atm. Commercial equipment for implementing the apparatus (not shown) performing the exhaust 32 function is available from various vendors, and is readily selected by one of ordinary skill in the arts pertaining to this description.

Referring to FIG. 1, deposition is carried out by repeated cycling of the platform 8 in the vertical direction, with a layer of soot or soot fused into glass deposited each cycle. An example range of the speed of moving the platform is from approximately 1 meter to 20 meters per minute (m/min). The speed is selected in part based on the layer thickness for each pass. The higher the speed is, the thinner the deposited layer will be. Typically, thinner layers are preferable for a multimode preform and thicker layers are preferable for a single mode preform.

When the total thickness of the deposited layers reaches the designed target, the tube 4 will be collapsed into a preform. Collapsing may be performed on-line by another torch, such as a conventional plasma or hydrogen/oxygen torch (not shown), which was idle during the deposition step, or by a furnace (not shown). Alternatively, collapse may be performed off-line by the collapse procedure of Applicants' co-pending U.S. application Ser. No. 10/193,197, which is hereby incorporated by reference.

The collapsed member formed from the tube deposited using the above-described described Ring Plasma Jet method or apparatus can either be a final preform, for drawing into an optical fiber by methods, known in the relevant arts, or a primary or intermediate preform for further deposition into a larger final preform. For example, if the collapsed member is only a primary preform, and a larger diameter final preform is desired, the diameter can be increased by jacketing using a known method such as that described by, for example, U.S. Pat. No. 4,596,589, with one or more jacketing tubes. Such jacketing tubes can be purchased or made, for example, using Applicants' process described by its U.S. Pat. No. 6,253,580. Another example method for forming the primary preform into a larger diameter final preform is to overclad the primary preform with more silica layers by a plasma torch, such as that described by U.S. Pat. No. 6,536,240, or by Applicants' U.S. Pat. No. 6,793,775, which uses an arrangement of multiple torches and/or primary preforms, both of which are hereby incorporated by reference. Still another example method for forming the primary preform into a final preform is to deposit additional soot layers by conventional flame hydrolysis and then through the processes of dehydration and consolidation to form fused silica.

When the preform has reached the desired outer diameter, it can be drawn into a fiber using conventional techniques, with the fiber-drawing furnace selected to have the heating capacity sufficient for the preform diameter. In addition, using techniques known in the art, a preform made by the present methods and apparatus can be stretched to a smaller diameter before being drawn.

The FIG. 1 example deposition apparatus rotates the work piece tube 4 about its longitudinal axis, which is oriented vertically in the FIG. 1 example, during deposition. However, because of the particularly unique ring jet flow pattern, i.e., an outward swirling pattern, of the Ring Plasma Jet flame 30, the Applicants contemplate that it is not necessary to rotate the deposition tube 4. Rotation was performed for making the examples herein because a rotation mechanism was available to Applicants. Applicants contemplate that the decision for rotating, or not rotating, will be determined in part, by preform uniformity requirements that are driven, as known to persons skilled in the art, by fiber performance requirements. Applicants contemplate that a person skilled in the art can readily, using for example a small number of test runs, determine if rotation is needed.

Figure 3:
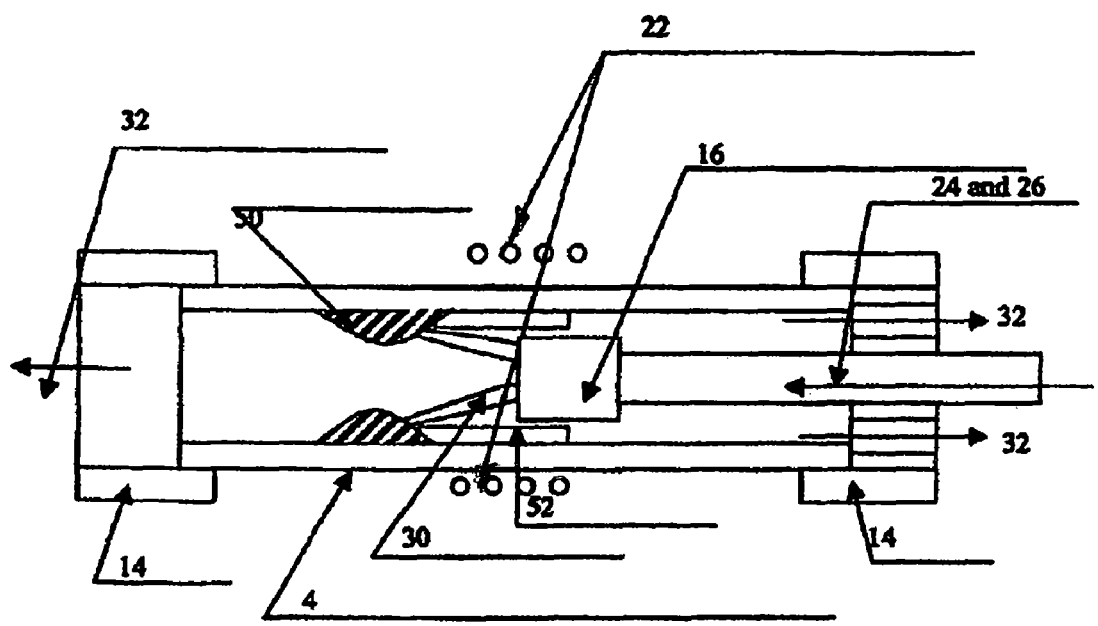
FIG. 3 illustrates a cross-section view of a feature for injecting the reagent chemicals along with the plasma gas, combinable with the FIG. 1 deposition apparatus or with a variation of the FIG. 1 apparatus holding a tubular member horizontal while depositing material using a Ring Plasma Jet flame according to another embodiment of the present invention.
Figure 4:
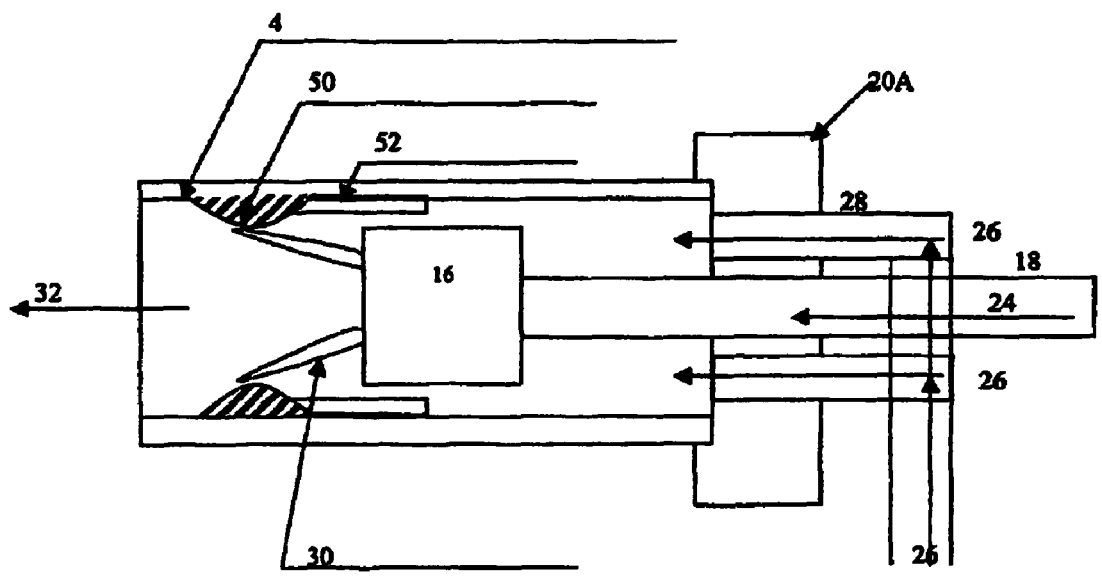
FIG. 4 illustrates a cross-section view of a feature for injecting the reagent chemicals along side the axis of plasma gas flow, combinable with the FIG. 1 deposition apparatus or with a variation of the FIG. 1 apparatus holding a tubular member horizontal while depositing material using a Ring Plasma Jet flame according to an embodiment of the present invention.
Figure 5:
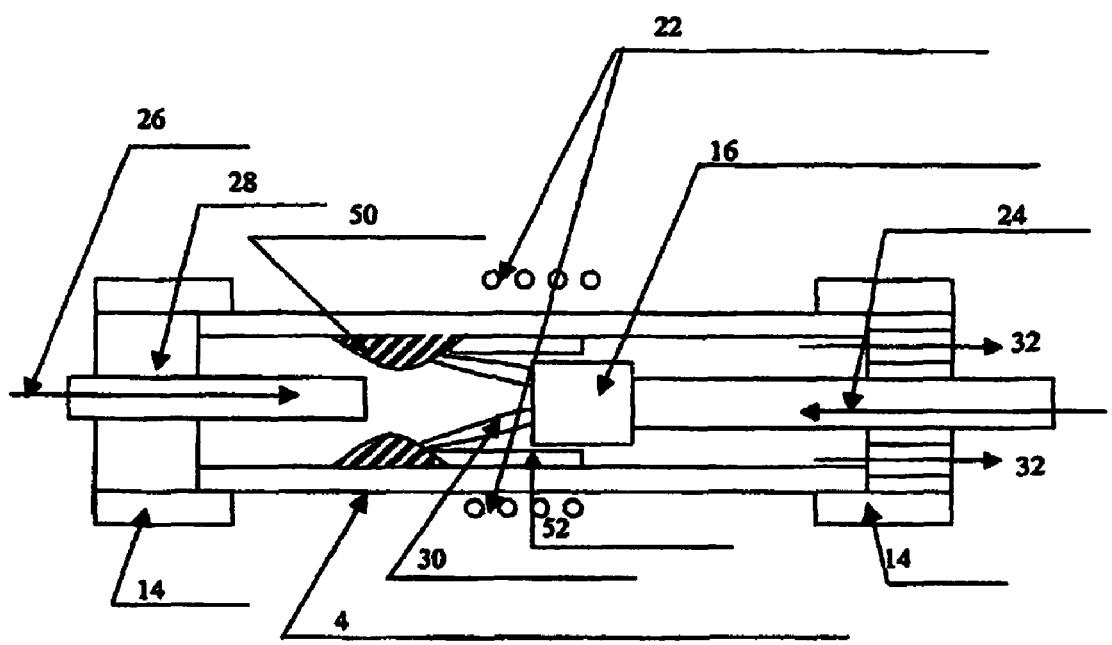
FIG. 5 illustrates a cross-section view of a feature operated in horizontal mode for injecting the reagent chemicals at an opposite end of the tubular member relative to the plasma gas according to an embodiment of the present invention.

Referring to FIGS. 1, 3, 4 and 5, the reagent chemicals 26 can be introduced by, for example, at least three optional apparatus and associated techniques. One of the example options is that described above in reference to FIG. 1. FIGS. 3 and 4 illustrate two additional example options, referenced as "Option 1" and "Option 2", respectively. FIG. 5 depicts the FIG. 1 Option 1 introduction of reagent chemical 26, modified for horizontal arrangement of the tube 4 instead of the FIG. 1 vertical arrangement. With respect to vertical and horizontal orientation of the tube 4, and hence the orientation of the support bar 18, vertical orientation during deposition is contemplated as being generally preferred, because such an arrangement likely reduces, if not eliminates, lateral stress that gravity would exert on the combination support and plasma gas feeder tube 16 and 18. The FIG. 1 apparatus 2 is an example showing the tubular member 4, and the support bar 18, being vertical during deposition. FIGS. 3 and 4, however, show the tubular member in a horizontal arrangement. This is shown because the above-described Ring Plasma Jet may be used for horizontal deposition as well and, therefore, it will be understood that each of the three FIG. 1, FIG. 3 and FIG. 4 options for introducing the reagent chemicals 26 can be used with either the vertical mode or the horizontal mode. FIG. 5 exemplifies this, because FIG. 5 shows the feeder gas arrangement of FIG. 1, modified for a horizontal tube 4 orientation.

Example Option 1 for reagent chemicals 26 introduction is shown in FIG. 3. As shown, the reagent chemicals 26 are introduced into the plasma torch using the same path as the plasma gas 24. Because the reagent chemicals 26 and gas 24 have different molecular weights, the reagents 26 will tend to travel on the outer envelope of the plasma gas stream. Therefore, when the gas stream leaves the plasma gas feeder nozzle 16 and enters into the Ring Plasma Jet region 30, the reagents 26 will be closer to the inner surface of the deposition tube 4. From the heat of the Ring Plasma Jet 30 most of the reagents will be reacted with $O_2$ and form oxides. Nearly all the soot particles 50 will be deposited on an inner surface of the tube with a high deposition rate. Simultaneously from the heat of the plasma 30, these soot particles will be consolidated into glass layer 52. With this FIG. 3 option, deposition takes place in both directions as the deposition tube 4 is moving back and forth on the lathe.

As described above, the FIG. 3 apparatus and method for introducing the reagent chemicals 26 is not limited to the horizontal deposition mode, as can be readily combined with the FIG. 1 vertical deposition apparatus 2.

Option 2 is shown in FIG. 4. The FIG. 4 reagent introduction also provides for deposition of material in both directions, i.e., when the deposition tube 4 moves back and forth on the lathe. Referring to FIG. 4, the reagents 26 are introduced from a rotary coupler 20A. This rotary coupler 20A will keep the plasma gas delivery tube 18 and reagent chemical supply tube 28 stationary while the deposition tube 4 is in rotation. The supply of reagents 26 is kept separate from the plasma gas 24, in a manner such that they are injected along the periphery of the plasma gas feeder nozzle 16 with the same flow direction as the plasma gas 24. The exhaust 32 is evacuated from the end of the deposition tube opposite the end the reagents 26 are introduced. The FIG. 4 configuration provides reagents 26 closer to the inner surface of the deposition tube 4, and therefore may achieve a higher deposition rate. The plasma torch, formed of the induction coil 22 surrounding the plasma gas feeder nozzle 16, has the same construction as in Option 1.

FIG. 5 shows what is referenced as Option 3, which is substantially the same as that described in reference to FIG. 1, except the deposition is conducted with the tube 4 in a horizontal position. As described, the reagents 26 are introduced into the end of the deposition tube 4 opposite that of the plasma gas 24, such that the reagents 26 will flow in an opposite direction against the plasma gas 24. When the two flows collide, the reagents 26 are forced toward the inner surface of the deposition tube 4. The exhaust 32 is located at the supply end of the plasma gas 24.

Figure 6:
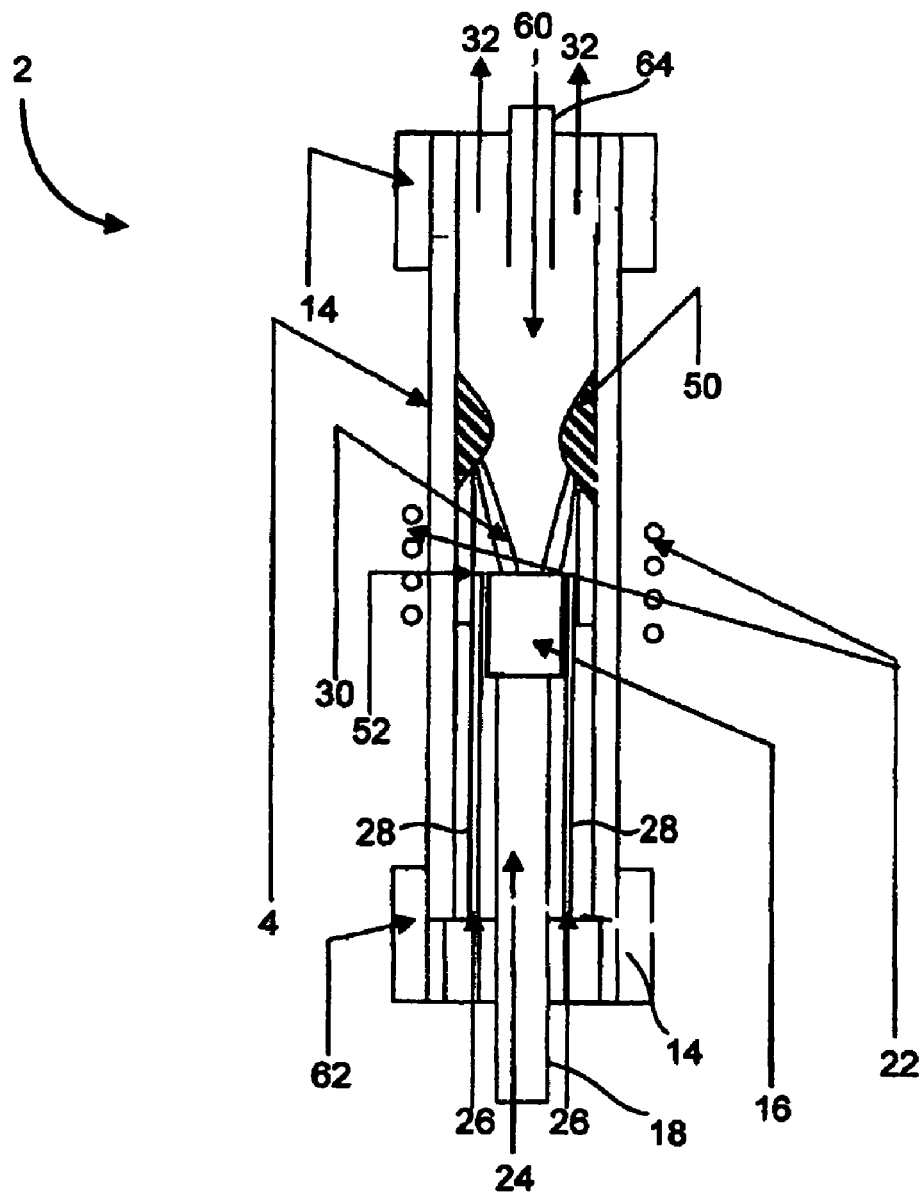
FIG. 6 illustrates a cross-section view of a deposition apparatus according to another embodiment of the present invention.

FIG. 6 illustrates a cross-section of another embodiment of a deposition apparatus 2, with a work piece, or deposition tube 4, installed. The deposition apparatus 2 includes a lathe or chuck support and movable platform (not shown) as described above. In this embodiment, the deposition tube 4 is in a vertical position. Mounted to the movable platform is a first rotatable chuck, or headstock, and a second rotatable chuck or tailstock (not shown) as described above. A pair of spindles 14 for securing the deposition tube 4 and rotating it about the work piece's longitudinal axis is included with the headstock 10 and tailstock 12. In addition, the deposition tube 4 is movable in the up and down direction.

A plasma gas feeder nozzle 16 is supported inside of the deposition tube 4 by a combination support and plasma gas delivery tube 18. The plasma gas feeder nozzle should be substantially centered in the tube 4, an example tolerance being approximately 1 mm. The materials and construction of the combination support and plasma gas delivery tube 18 must account for the weight of the plasma gas feeder nozzle 16 and the operational temperature conditions. Upon reading the present description, the selection of such construction and materials is a design choice readily made by persons skilled in the art of optical fiber manufacturing. Example materials are quartz and stainless steel. Other example materials include titanium and high-temperature alloys such as, for example, INCONEL of Ni, Cr, Fe and other metals, and equivalents. The combination support and plasma gas delivery tube 18 extends out from an end of the deposition tube 4, having a rotational gas coupler 62 attached. An example construction of the plasma gas feeder nozzle 16 is described in further detail above in reference to FIG. 2.

Referring to FIG. 6, an induction coil 22 is supported to surround the outside of the deposition tube 4. A conventional-type RF plasma energy source of, for example, 80 kW, is connected to the induction coil. It will be understood that the power of the generator will vary in the range from 20 kW to 80 kW, depending on the diameter of the deposition tube 4. For example, for a tube with 64 mm outer diameter, a typical power range is between 30 to 40 kW. The induction coil 22 and the plasma gas feeder nozzle 16 are supported to remain stationary in the FIG. 6 depicted alignment, which is that the nozzle's gas outlet (not show in FIG. 6) is surrounded by the coil 22, as the platform translation drive moves the platform 8 in the vertical direction A, thereby moving the deposition tube 4 in the vertical direction.

A dry plasma gas 24, such as Ar, $O_2$, $N_2$, He, Kr, or mixtures thereof, preferably with a total moisture content less than 10 ppb OH, is delivered from the bottom end of the deposition tube 4 by the rotational coupler 62, through the combination support and delivery tube 18, into the plasma gas feeder nozzle 16. In FIG. 6, reagent chemicals and carrier gas 26 are fed through a tube 28 made, for example, of quartz, from the bottom side of the deposition tube 4. To prevent the moisture diffusion from the bottom side of the deposition tube 4, another rotational coupler (not shown) is preferably used with the deposition tube 28. Example reagent chemicals 26 are the base glass forming material such as, for example, $SiCl_4$, and the dopants for modifying the index of refraction of silica such as, for example, $GeCl_4$, $POCl_3$, $AlCl_3$, $TiCl_4$, $SiF_4$, $CF_4$, $SF_6$, and $BCl_3$. The carrier gas can be $O_2$ or the mixture of $O_2$ and He. The carrier gas can be $O_2$ or the mixture of $O_2$ and He. To ensure the complete oxidation reaction, it is necessary to provide sufficient amounts of oxygen to the reaction zone.

In FIG. 6, carrier gas and reagent chemicals 26 flow in the same direction as the plasma gas 24, thus newly deposited glass layer material will be formed on the upper side of the plasma gas feeder nozzle 16. It should be understood that the FIG. 6 apparatus can deposit glass both when the deposition tube 4 is moving up and when the tube is moving down, relative to the vertical direction A.

It is possible to feed the reagent chemicals 26 without the tube 28, but use of the tube is typically preferable, as it would generally enable more stable and better-controlled conditions for the chemical reaction.

The plasma gas feeder nozzle 16 is preferably constructed and arranged to generate an at least partially radial flame, which as identified above is termed herein as the "Ring Plasma Jet" flame 30, which is a plasma flame having at least a portion or component directed toward the inner surface of the tube 4. As described above, term "Ring Plasma Jet" is used because, typically, during a deposition process as described herein, a bright ring forms on the deposition tube 4 where the deposition and consolidation of the glass takes place. The radial direction of the ring plasma jet 30 is the driving force to form this ring.

As described above, the deposition tube 4 in the embodiment of FIG. 6 shows that it is operated in the vertical mode. The deposition will take place when the deposition tube 4 moves up and down relative to the Ring Plasma Jet flame 30. The plasma forming gas 24 is supplied from the bottom through plasma gas delivery tube 18. The gas or vapor phase source chemicals (reagents) 26 are introduced from a rotary coupler 62. This rotary coupler 62 will keep the plasma deposition tube 18 and reagent chemical supply tube 28 stationary while the deposition tube 4 is in rotation. The supply of reagents 26 is kept separate from the plasma gas 24, in a manner such that they are injected along the periphery of the plasma gas feeder nozzle 16 with the same flow direction as the plasma gas 24. The liquid phase of dopants in the form of aerosol 60 or solid phase dopants in the form of small particles 60 will feed into the reaction zone from the top through reagent chemical supply tube 64. A constant flow of inert gas is also feed into the tube 64, it can ensure the proper delivery of the dopants chemicals, prevent the possible unwanted soot deposition on the inside surface of the supply tube 64, and also improve the deposition rate. The exhaust 32 is evacuated from the top end of the deposition tube 4. The plasma torch, formed of the induction coil surrounding the plasma gas feeder nozzle 16, has the same construction as described above.

In one embodiment, the reagent chemicals are injected in the rotational flow pattern that is similar to the plasma gas and also in the same rotational direction as plasma gas. By doing so, the deposition efficiency is greatly increased. It is also important to note that when the reagent chemicals and plasma gas are injected from the same side, they will have the same rotational direction. Conversely, when the reagent chemicals and plasma gas are injected from the opposite sides, they will have opposite rotational directions. For example, if the plasma gas has a clockwise rotation, then the reagent chemical stream will have a counterclockwise rotation. This will minimize deposition efficiency and create an uncontrollable turbulent flow inside the tube.

The following example is provided to further illustrate the preferred embodiments of the present invention, but should not be construed as limiting the invention in any way.

EXAMPLE 1

Making a Single Mode Preform

Applicants made a single mode preform, by using a deposition tube 4 having an inside diameter (ID) of 60 mm and an outside diameter (OD) of 64 mm. Applicants used a plasma gas feeder 18 with a diameter of 40 mm and a length of 80 mm. First, a cladding was deposited consisting of $SiO_2$, $GeO_2$, $P_2O_5$, and F with a thickness of 4 mm and then deposited a core with $SiO_2$ and $GeO_2$, for a step index profile, with a thickness of 1 mm. At a deposition rate of 8 g/min, the total deposition time was less than 5 hours. Then this tube was collapsed into a preform with an OD of 40 mm and a core diameter of 14 mm. To complete this single mode preform, more fused silica glass was deposited on the outside to build the final outer diameter to be 208 mm as a finished preform. From a meter long preform with this diameter, more than 2,700 km of single mode fiber could be produced.

Although the example preform was for making single mode step index preform, this method can make all types of preforms including both step and graded index preform.

The reagent chemicals 26 can be in gas or vapor phase, or in solid form. For the latter, small particles of oxides or halides of the glass formers or index modifiers can feed to the plasma flame to make the desired glass. Some exemplary compounds include high purity $GeO_2$, $P_2O_5$, $Al_2O_3$, $Er_2O_3$, $Nd_2O_3$, $ErCl_3$, $ErF_3$, $NdCl_3$, $NdF_3$, and the like.

This method can also make active fiber by doped with elements from the rare earth group such as, for example, Erbium ($Er^{3+}$) or Neodymium ($Nd^{3+}$). In one embodiment, $Er^{3+}$ and $Nd^{3+}$ are the dopants for making an active fiber and can be used in the form of a solid. Specifically, the solid $Er^{3+}$ and $Nd^{3+}$ dopants are dissolved in a solvent. Then, one or more unconsolidated soot layers are deposited on the inside wall of the deposition tube. The solvent containing the solid $Er^{3+}$ and $Nd^{3+}$ dopant particles are then flowed through the inside of the deposition tube. The unconsolidated soot particles are allowed to absorb the dopant particles. Excess liquid from the solvent is then removed, and then the deposition tube is heated to induce the necessary chemical reaction to form the oxides discussed herein. This is then followed by a dehydration step, a consolidation step, and finally a collapsing step, thereby producing the finished perform.

The Ring Plasma Jet and its high deposition rate are not limited to being established by the induction coil 22. Through the use of plasma gas feeder nozzles, such as item 16 of FIG. 1 and its FIG. 2 example detailed construction, the present inventors contemplated that other power sources, such as RF capacitive-source or microwave will generate the Ring Plasma Jet.

As can be understood, the Ring Plasma Jet, such as the FIG. 1 flame 30, because it directs the soot particles toward the tube 4 inner wall, provides substantial deposition rate improvements over the prior art methods for inside deposition. Based on observed results, the present inventors contemplate deposition rates exceeding 8 grams per minute while, at the same time, obtaining very high quality results.

Figure 7:
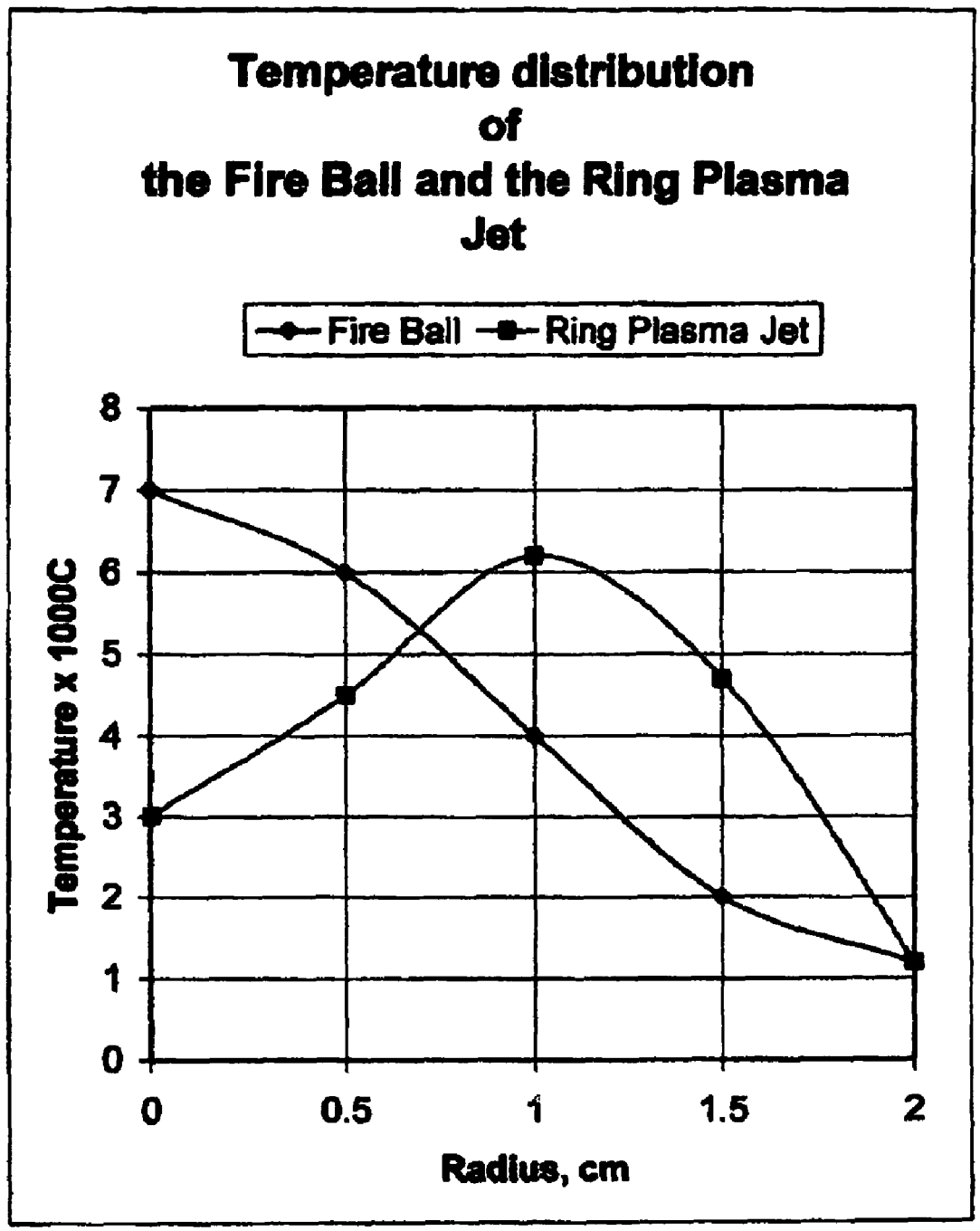
FIG. 7 is a temperature profile chart showing a comparison of typical temperature profile of a Ring Plasma Jet flame and a "fire ball" plasma flame of the prior art.

FIG. 7 shows a comparison of the temperature profile for a Ring Plasma Jet flame produced according to this description and the temperature profile of a "fire ball" plasma flame created by the methods of the prior art. The measurements were obtained using a spectrograph and inverted Abel integral equation procedure, similar to that presented in the article by T. B. Reed "Induction-Coupled Plasma Torch", *Journal of Applied Physics*, vol. 12, number 5, May, 1961, pp. 821-824 in the paragraph Plasma Temperature Measurements.

Figure 8:
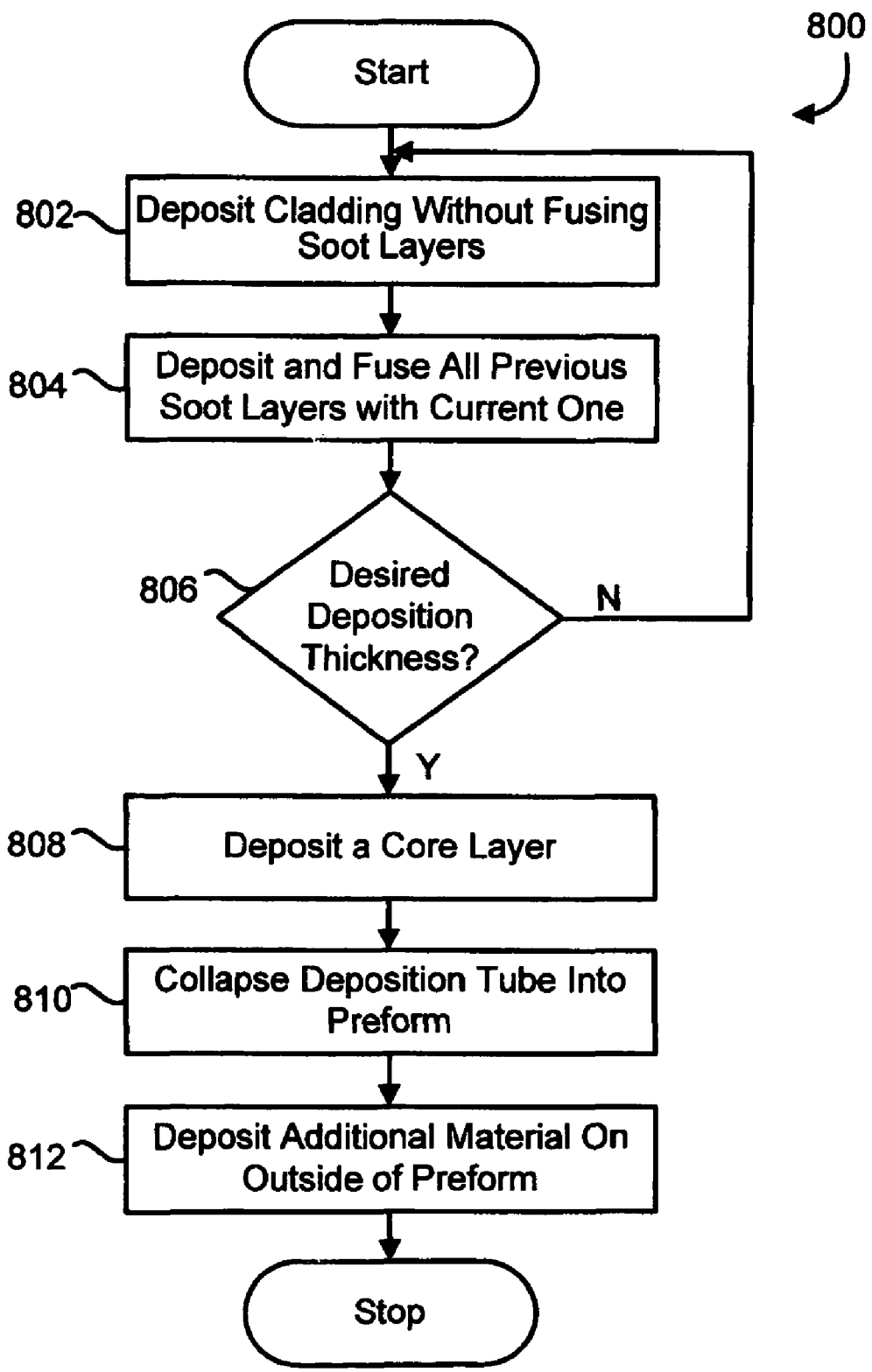
FIG. 8 illustrates a flow diagram of a process for making an optical fiber preform according to an embodiment of the present invention.

In addition to the aforementioned aspects and embodiments of the present apparatus for making an optical fiber perform, the present invention further includes methods for making an optical fiber preform. FIG. 8 illustrates a flow diagram of an embodiment 800 of one such process. The steps 802, 804 and 806 are the processing loop for making the cladding layers of a preform, a cladding is deposited for a total thickness of 4 mm; the index of refraction of the cladding is matched to be the same as pure silica. This layer consisted of preferably $SiO_2$, $GeO_2$, and fluorine. To minimize the negative impact from the etching fluorine, the deposition was performed using the following technique. In step 802, more than one layer of soot, consisting of $SiO_2$ and $GeO_2$, is deposited on the fiber preform, more specifically, 2 or 3 layers of soot are deposited on the inside wall of the tube. During the deposition of these soot layers they are not fused to vitreous glass layers. This deposition is performed at a high traverse speed and low deposition energy.

In step 804, the next deposition layer consisting of $SiO_2$, $GeO_2$, and F. A fluorine containing chemical is introduced with the $SiO_2$ and $GeO_2$ into the feeder and during this pass all previously unconsolidated soot layers are fused into vitreous glass with dopants of $GeO_2$ and F. In step 806, the layer thickness is checked and this deposition process is continued until a deposition thickness of 4 mm is achieved. In step 808, a similar deposition technique (deposition and consolidation at the same time) is followed to deposit a core of 1 mm that consisted of $SiO_2$ and $GeO_2$. During this deposition process, an average deposition rate of 9 g/min. was achieved, with a deposition time of approximately 3.5 hours.

In step 810, the deposition tube is then collapsed into a preform with an outer diameter of approximately 40 mm and a core diameter of approximately 14 mm. In step 812, more silica glass is deposited and fused to the outside of the deposition tube to build up the outer diameter to be approximately 208 mm. This produces a finished optical fiber preform having a length of approximately 1 meter. This optical fiber preform produced more than 2,700 kilometers of single mode optical fiber.

In addition to the improved optical fiber production from the optical fiber preform, it was observed that the deposition taper at the ends of the deposition tube were significantly reduced over prior methods.

Although there has been described what is at present considered to be the preferred embodiments of the ring plasma jet method and apparatus for making an optical fiber preform, it will be understood that the present method and apparatus can be embodied in other specific forms without departing from the spirit or essential characteristics thereof. For example, soot layer compositions, other than those described herein, could be used without departing from the spirit or essential characteristics of the present method and apparatus. In addition, dopant types or compositions; preform sizes; and direction of reagent flows, other than those described herein, could be used without departing from the spirit or essential characteristics of the present method and apparatus. The present embodiments are, therefore, to be considered in all aspects as illustrative and not restrictive. The scope of the present ring plasma jet method and apparatus for making an optical fiber preform is indicated by the appended claims rather than the foregoing description.

What is claimed:

1. An apparatus for making an optical fiber preform, comprising:
   means for injecting a plasma source gas into the first end of a tubular member having a central longitudinal axis;
   means for generating a radio frequency ring plasma flame having a temperature of at least 3,000° C. with said plasma source gas flowing through a plasma gas feeder nozzle, said plasma gas feeder nozzle comprising:
   a flow direction control structure;
   an inner tube, and
   an outer tube, wherein the flow direction control structure injects said plasma source gas between said inner tube and said outer tube to produce a swirl plasma gas stream that establishes the said radio frequency ring plasma flame, such that at least a portion of said radio frequency ring plasma flame is directed radially toward an inner surface of said tubular member;
   means for traversing said tubular member along said longitudinal axis relative to said radio frequency ring plasma flame;
   means for depositing at least one unconsolidated soot material layer on the interior surface of said tubular member by introducing reagent chemicals into said radio frequency ring plasma flame, said reagent chemicals being introduced into said first end of said tubular member at a predetermined distance from said plasma gas feeder nozzle.

2. The apparatus of claim 1 wherein said means for generating a radio frequency ring plasma flame further comprises:
   means for establishing an oscillating electromagnetic field in said interior volume of said tubular member.

3. The apparatus of claim 1 wherein said reagent chemicals are injected at a position in the interior of said tubular member spaced a predetermined distance from said plasma gas feeder nozzle, in the direction of said longitudinal axis, and are injected in the same direction in which a portion of the plasma gas is injected.

4. The apparatus of claim 1 wherein said means for depositing at least one unconsolidated soot material layer further comprises:
   means for introducing a dopant reagent into said plasma flame, said dopant reagent being introduced into a second end of said tubular member at a predetermined distance from said radio frequency ring plasma flame, said dopant reagent is introduced in the opposite direction in which a portion of the plasma gas is injected.

5. The apparatus of claim 4 wherein said means for introducing a dopant reagent into said radio frequency ring plasma flame further comprises:
   means for introducing said dopant reagent into said radio frequency ring plasma flame after the deposition of at least one or more unconsolidated soot material layers produced by said reagent chemicals.

6. The apparatus of claim 4 wherein said means for introducing a dopant reagent into said radio frequency ring plasma flame further comprises:
   means for introducing an inert gas with said dopant reagent into said plasma flame, said inert gas is introduced in the opposite direction in which a portion of the plasma gas is injected.

7. The apparatus of claim 4 wherein said dopant is in a solid phase.

8. The apparatus of claim 1 wherein said means for traversing further comprises:
means for moving said tubular member relative to said radio frequency ring plasma flame a predetermined deposition length in the direction of said longitudinal axis.

9. The apparatus of claim 8 wherein the predetermined deposition length remains substantially constant concurrent with said moving the said tubular member.

10. The apparatus of claim 8 wherein said means for moving said tubular member relative to said radio frequency ring plasma flame a predetermined deposition length in the direction of the longitudinal axis moves said ring a corresponding distance, and wherein said depositing a material includes depositing the material on said moving ring.

11. The apparatus of claim 1 wherein said means for traversing said tubular member further comprises:
means for selectively rotating said tubular member concurrent with at least a portion of a duration of said generating a radio frequency ring plasma flame and depositing a material.

12. The apparatus of claim 1 wherein said means for injecting a plasma gas source includes providing a plasma gas feeder nozzle in said interior volume of said tubular member.

13. The apparatus of claim 12 wherein a portion of said radio frequency ring plasma flame is incident on a ring around an inner surface of the tubular member, having a rotational velocity about said longitudinal axis, thereby forming a plasma ring, and wherein said depositing said material includes depositing said material on said plasma ring.

14. The apparatus of claim 13 wherein said reagent chemicals have the same swirl flow as said radio frequency ring plasma flame.

15. The apparatus of claim 1 wherein concurrent with at least a part of a duration of said depositing a pressure is maintained within said tubular member, said pressure being between approximately 0.1 and 1 atmosphere.

16. The apparatus of claim 1 wherein said means for depositing comprises:
means for positioning said tubular member in a substantially vertical position.

17. The apparatus of claim 1 further comprising:
means for collapsing said optical fiber preform.

18. The apparatus of claim 17 further comprising:
means for depositing at least one layer of vitreous glass on the outside of said collapsed optical fiber preform.

* * * * *